United States Patent
Lin

(10) Patent No.: US 6,675,910 B1
(45) Date of Patent: Jan. 13, 2004

(54) STRUCTURE OF HAND TOOL

(76) Inventor: Wu-Chang Lin, 16F-6, No. 62, Sec 1, Jincheng Rd., Tucheng City, Taipei Hsien (TW)

( * ) Notice: Subject to any disclaimer, the term of this patent is extended or adjusted under 35 U.S.C. 154(b) by 0 days.

(21) Appl. No.: 10/464,460

(22) Filed: Jun. 19, 2003

(51) Int. Cl.$^7$ .............................................. B25B 21/00
(52) U.S. Cl. ...................... 173/109; 173/132; 173/164; 173/217; 279/19.4
(58) Field of Search .......................... 173/93, 93.5, 216, 173/217, 213, 29, 109, 132; 81/475, 474; 279/19.4, 19.7, 19.3

(56) References Cited

U.S. PATENT DOCUMENTS

| | | | | |
|---|---|---|---|---|
| 3,802,518 A | * | 4/1974 | Albert ......................... | 173/217 |
| 4,091,880 A | * | 5/1978 | Troutner et al. ............ | 173/217 |
| 4,400,995 A | * | 8/1983 | Palm ........................... | 173/164 |
| 5,360,073 A | * | 11/1994 | Akazawa ..................... | 81/475 |
| 5,765,652 A | * | 6/1998 | Mathis et al. ................ | 173/216 |
| 6,202,760 B1 | * | 3/2001 | Lin ............................. | 173/132 |
| 6,273,200 B1 | * | 8/2001 | Smith et al. .................. | 173/29 |
| 6,311,787 B1 | * | 11/2001 | Berry et al. ................. | 173/216 |

* cited by examiner

*Primary Examiner*—Scott A. Smith
(74) *Attorney, Agent, or Firm*—Bacon & Thomas, PLLC

(57) ABSTRACT

An improved structure of hand tool comprising a first pipe, a second pipe, a rotating sleeve, a pushing member, a pushing axle-rod and a chuck, wherein: the first pipe has thereon a position-limiting slot and two positioning holes provided for extending therethrough of two position-limiting elements; the first pipe has thereon an elastic piece to abut against the position-limiting elements; the rotating sleeve is slipped over the first pipe and has thereon in opposition to the position-limiting slot a hole for extending of a pivotally-connecting element therein to connect and lock the pushing member, the hole has on the inner wall thereof a positioning groove to engage the position-limiting elements and to make positioning with the elastic piece; the pushing member is slipped over the pushing axle-rod which has a bearing thereon; and one end of the pushing axle-rod is brought to rotate by a driving element, the other end is pivotally connected with the chuck, and the hand tool is completed to be able of fast changing a grinding member during operation.

5 Claims, 6 Drawing Sheets

STRUCTURE OF HAND TOOL

BACKGROUND OF THE INVENTION

1. Field of the Invention

The present invention is related to an improved structure of hand tool, and especially to a hand tool suitable for fast changing a grinding member during operation.

2. Description of the Prior Art

The inventor of the present invention had provided an "Improved Structure of Multi-functional Hand Tool" which was granted with a patent of utility model in Taiwan with a patent publish number of 447,362 and granted with a patent of invention in U.S.A. with a patent number of U.S. Pat. No. 6,202,760B1; the main structure of the hand tool, as shown in FIGS. 1 and 2, comprises a chuck 60, a positioning sleeve 14, a pushing axle-rod 50, a pushing member 40, a pipe 70 and an outer sleeve 80.

With the above members, the chuck 60 and the pushing axle-rod 50 are extended into the positioning sleeve 14 respectively from two ends of a central axle hole of the latter, a bolt on the front end of the pushing axle-rod 50 is screw connected with an inner thread of the chuck 60, a spring slipping over the pushing axle-rod 50 is exactly pressed against between an annular protrusion and a stop ring of the positioning sleeve 14; a rear bolt on the rear end of the pushing axle-rod 50 is screw connected with a driving rod, and an outer annular member for the positioning sleeve 14 is slipped in two sliding bearings 142, then the positioning sleeve 14 is placed together with pushing axle-rod 50 and the chuck 60 into the pipe 70 to render the positioning sleeve 14 able to rotate on the sliding bearings 142, a front inner thread of the pipe 70 is connected with an outer thread of a front collar, so that the chuck 60 is extended out of the front end of the front collar.

The pipe 70 has a rear inner thread on the rear end thereof locked into the pushing member 40, so that a cylindrical rod on the front end of the pushing member 40 abuts against the rear area of the annular protrusion of the pushing axle-rod 50; while a hole on a thread portion of the outer annular member of the pushing member 40 is exactly located at the position where a position-limiting annular groove of the pipe 70 is. The rear end of the pipe 70 is slipped in the outer sleeve 80, and an inner screw hole of the outer sleeve 80 is aligned with the position-limiting annular groove of the pipe 70, then a positioning bolt is locked into the inner screw hole to extend through the position-limiting annular groove and the hole on the pushing member 40 to complete the hand tool.

From the above disclosed structure of the "Improved Structure of Multi-functional Hand Tool", it has the pushing member 40 moved mainly by rotating of the outer sleeve 80, so that the pushing member 40 and the outer sleeve 80 are moved synchronically; and by using the pushing member 40 to push the pushing axle-rod 50, while the pushing axle-rod 50 is connected by locking with the chuck 60, when the pushing axle-rod 50 is pushed by the pushing member 40, it moves the chuck 60 and pushes the chuck 60 toward the outside of the pipe 70 to make the chuck 60 become a loosened state, and now a grinding member 90 can be changed.

However, such a structure must have the grinding member 90 changed under the state that the hand tool is stopped. By virtue that the pushing axle-rod 50 is linked up with the driving rod, when the pushing axle-rod 50 is pushed by the pushing member 40, the pushing axle-rod 50 will generate an axial pulling force against the driving rod, this tends to damage the axle.

SUMMARY OF THE INVENTION

Therefore, the inventor of the present invention provides the improved structure of hand tool based on his professional experience of years in studying, designing and manufacturing same kind of products and after hard study, developing, as well as repeated experiments and tests, in order to make the hand tool get the object of changing a grinding member fast, and to avoid the axle from damage, the structure for changing of it is perfect.

The present invention mainly comprises a first pipe, a second pipe, a rotating sleeve, a pushing member, a pushing axle-rod and a chuck, it is characterized in that: the first pipe is provided thereon with a position-limiting slot and a plurality of positioning holes, the positioning holes are provided for extending therethrough of two position-limiting elements; the first pipe is provided thereon with an elastic piece for abutting against the position-limiting elements; the rotating sleeve is slipped over the first pipe, and is provided thereon in opposition to the position-limiting slot with a hole for extending of a pivotally-connecting element therein to connect and lock the pushing member, the hole has on the inner wall thereof a positioning groove to engage the position-limiting elements and to make an effect of positioning with the elastic piece; the pushing member is slipped over the pushing axle-rod, the pushing axle-rod has a bearing slipping thereover; and one end of the pushing axle-rod is brought to rotate by a driving element, the other end is pivotally connected with the chuck, and assembling of the hand tool thus is completed.

The object of the present invention is to have the pushing member moved mainly by rotating of the rotating sleeve, so that the pushing axle-rod is endued with an axial pushing force to make the chuck to push toward the outside of the first pipe to make the chuck become a loosened state; by virtue that the pushing axle-rod has a bearing thereon, when the pushing axle-rod is driven by the driving element, the pushing axle-rod can keep on operating to avoid being blocked, thereby the hand tool able to fast change the grinding member during operation can be provided.

Another object of the present invention is resided in that: the driving element is provided in the second pipe, and the driving element is connected with an electric power-line by insertion connecting through a connecting device to allow a user to change the driving element by himself.

The present invention will be apparent in its content and the effect to be achieved after reading the detailed description of the preferred embodiment thereof in reference to the accompanying drawings.

DETAILED DESCRIPTION OF THE PREFERRED EMBODIMENT

Figure 1:
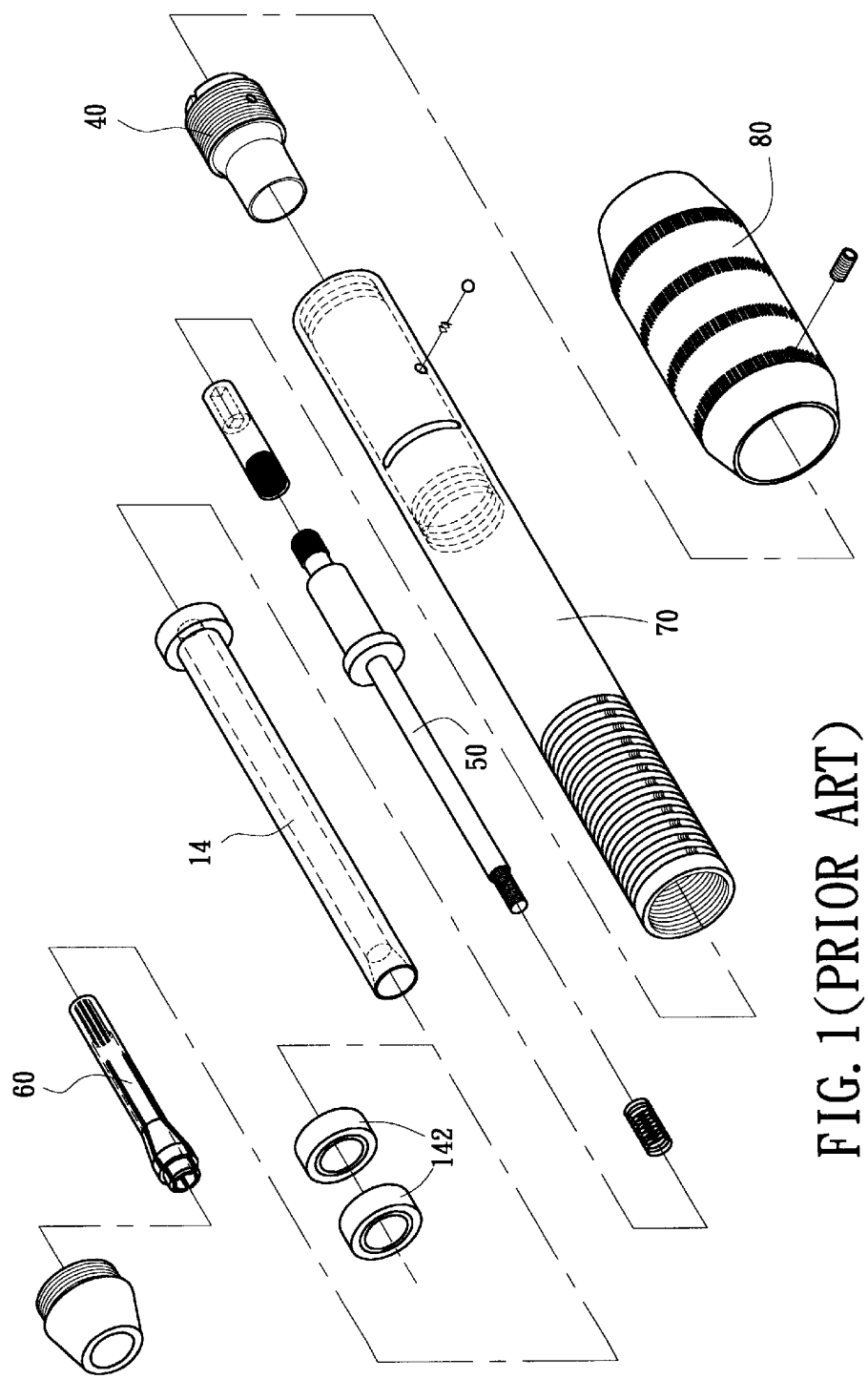
FIG. 1 is an analytic perspective view of a conventional structure developed by the inventor of the present invention.
Figure 2:
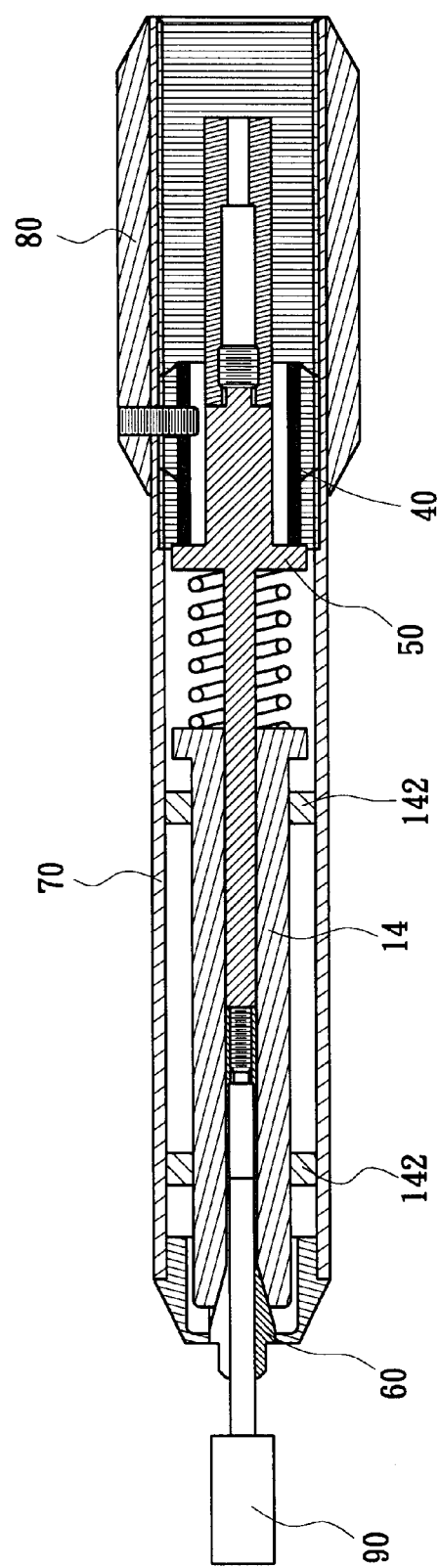
FIG. 2 is a sectional schematic view of the above structure.
Figure 3:
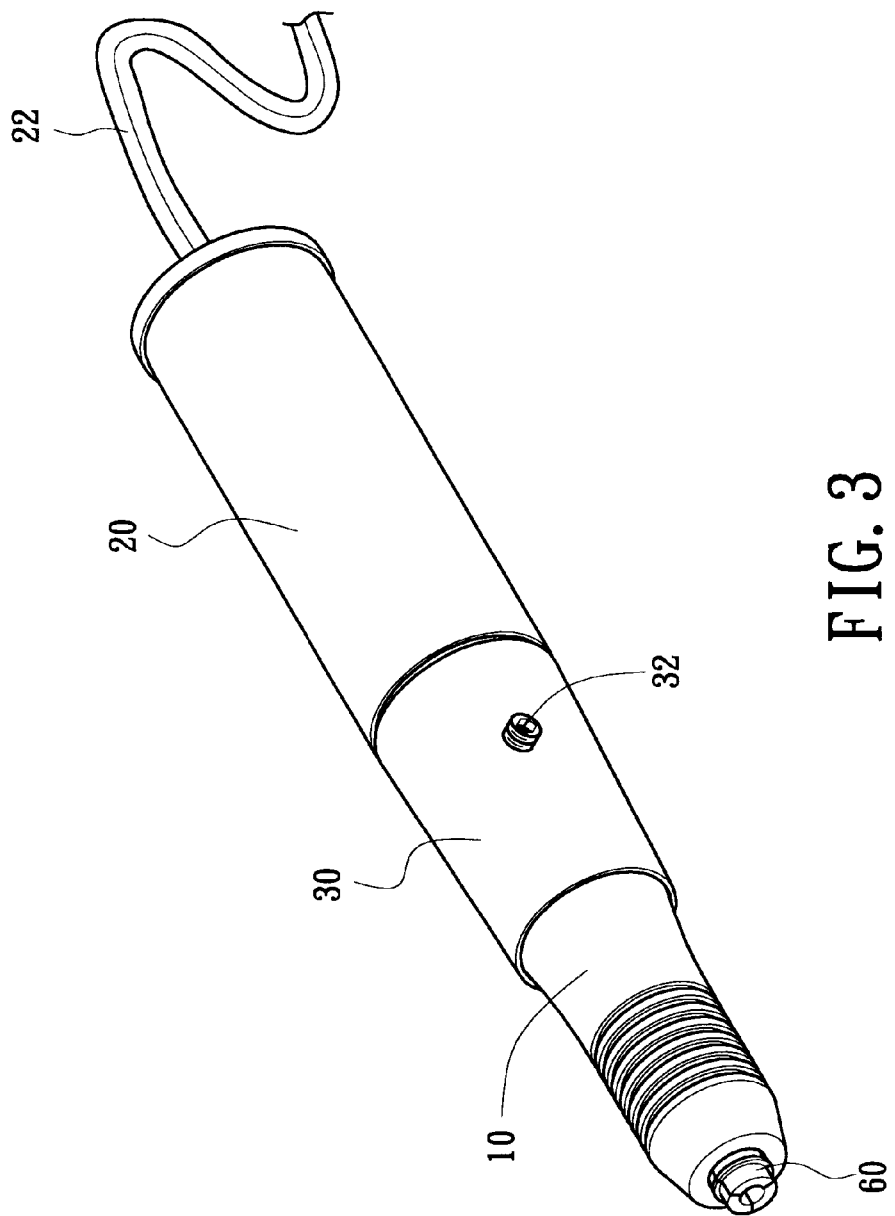
FIG. 3 is a perspective view after assembling of the present invention.
Figure 4:
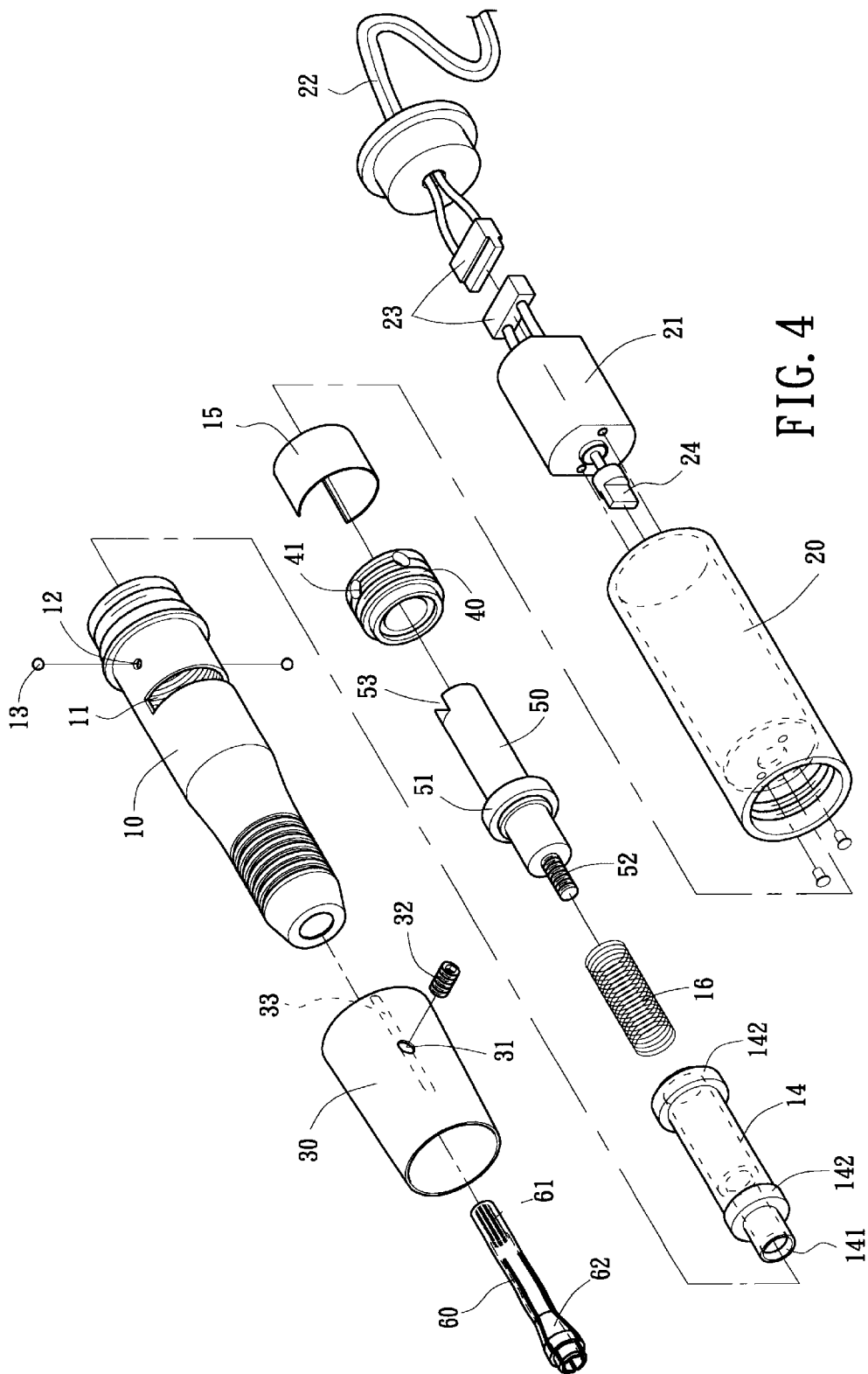
FIG. 4 is an analytic perspective view of the structure of the present invention.

Referring to FIGS. 3 and 4, the present invention is comprised mainly of a first pipe 10, a second pipe 20, a rotating sleeve 30, a pushing member 40, a pushing axle-rod 50 and a chuck 60.

Wherein: the first pipe 10 is provided on the outer wall thereof with a position-limiting slot 11 and two positioning holes 12, the positioning holes 12 are provided each for extending therethrough of a position-limiting element 13; the first pipe 10 is provided therein with a positioning sleeve 14 and an elastic piece 15; the positioning sleeve 14 has on the front end thereof a truncated conical inner surface 141, has on the external surface thereof two sliding bearings 142 to make the positioning sleeve 14 smoothly operate and position in the first pipe 10, and has therein a restoring element 16; the elastic piece 15 is provided at a position in opposition to that of the two positioning holes 12 to limit operation of the position-limiting elements 13;

the second pipe 20 is connected to the rear end of the first pipe 10, and is provided therein with a driving element 21, the driving element 21 is fixed in the second pipe 20 with a fixing element, the driving element 21 further is insertion connected with an electric power-line 22 through a connecting device 23 to allow independent detaching of the driving element 21 for changing when being damaged, the driving element 21 is formed on the other end thereof a driving rod 24;

the rotating sleeve 30 is slipped over the first pipe 10, and is provided therein in opposition to the position-limiting slot 11 of the first pipe 10 with a hole 31, the hole 31 has therein a pivotally-connecting element 32 which extends through the hole 31 and the position-limiting slot 11 to connect and lock the pushing member 40, a positioning groove 33 is provided at the position in coincident with that of the position-limiting element 13 on the first pipe 10;

the pushing member 40 has a locking hole 41 for locking the pivotally-connecting element 32, the pushing member 40 is linked up with the rotating sleeve 30, and is slipped over the pushing axle-rod 50;

the pushing axle-rod 50 has thereon a bearing 51, and is provided on an end thereof in facing to the positioning sleeve 14 with a bolt 52 for connecting and locking the chuck 60, and is provided on the other end thereof with a notch 53 in coincident by position with the driving rod 24 formed on the driving element 21; the driving rod 24 can be placed in the notch 53 to make linking up of the pushing axle-rod 50 with the driving element 21;

the chuck 60 is provided on an end in opposition to the bolt 52 on the pushing axle-rod 50 with an inner thread 61, so that the chuck 60 is locked on the pushing axle-rod 50; the other end of the chuck 60 has on the wall thereof a guiding bevel surface 62 coincident in shape with the truncated conical inner surface 141 of the positioning sleeve 14, so that the chuck 60 can be clamped tight and loosened in pursuance of the engaging state of the truncated conical inner surface 141 with the guiding bevel surface 62, to allow changing of a grinding member.

Figure 5:
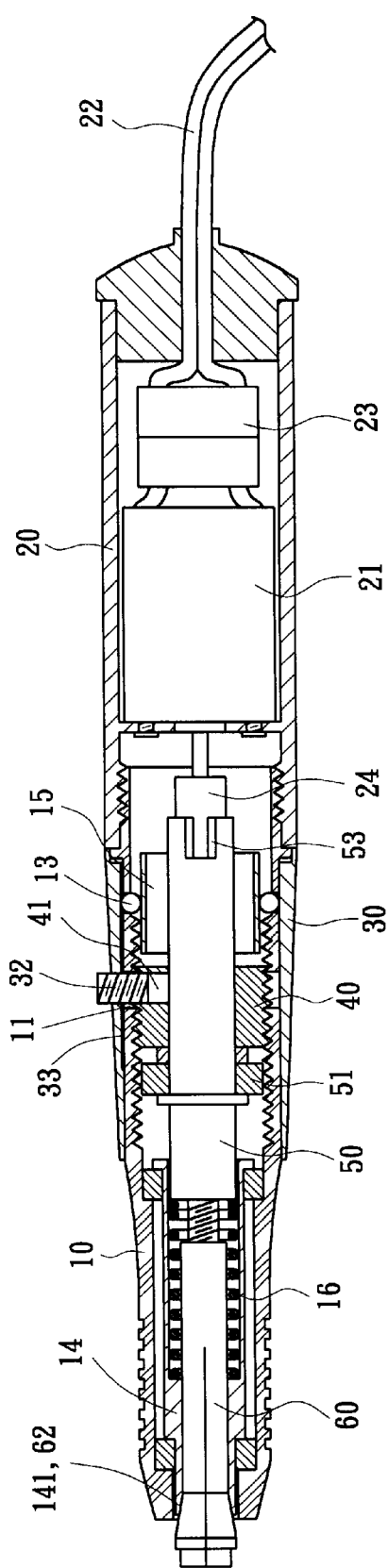
FIG. 5 is a sectional schematic view of the present invention.
Figure 6:
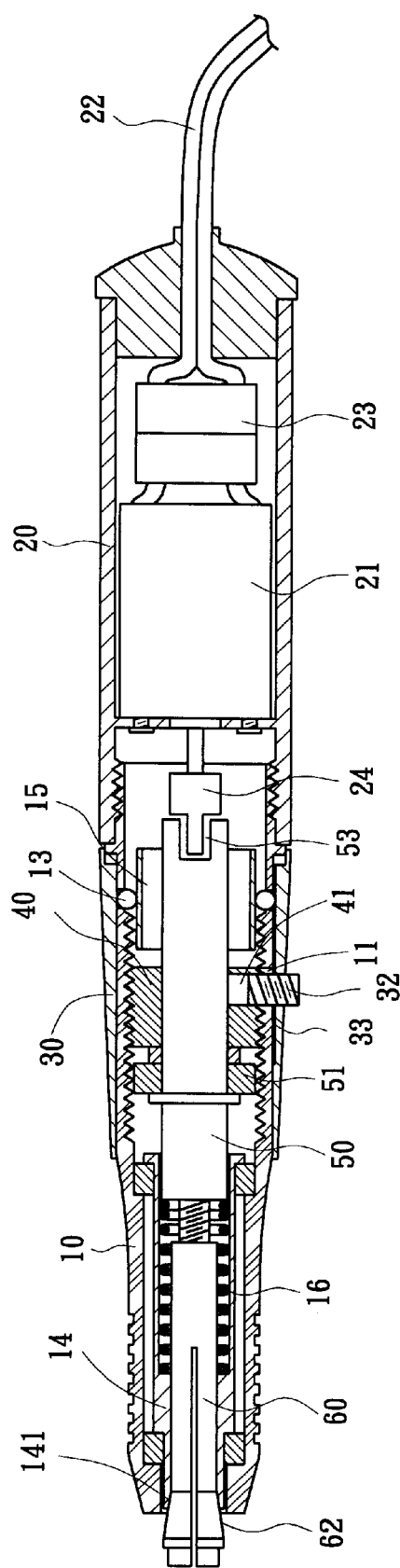
FIG. 6 is another sectional schematic view of the present invention.

Referring to FIGS. 5 and 6, the present invention mainly provides a hand tool capable of changing a grinding member during operation, the mode of operation thereof is, when the driving element 21 is operated, by moving of the driving rod 24, the pushing axle-rod 50 and the driving element 21 operate synchronically and bring the chuck 60 to operate; when it is to change the grinding member during operation, it needs only to rotate the rotating sleeve 30 on the first pipe 10.

By the fact that the rotating sleeve 30 is pivotally connected to the pushing member 40 using the pivotally-connecting element 32, the pushing member 40 is provided in the first pipe 10, thereby the pushing member 40 and the rotating sleeve 30 synchronically rotate; and the pushing member 40 is locked by rotating in the first pipe 10, thereby, when the pushing member 40 is rotated by the rotating sleeve 30, the pushing member 40 will made displacement in the first pipe 10, hence the pushing member 40 pushes the bearing 51 on the pushing axle-rod 50 which then pushes the chuck 60 and keeps rotating of the pushing axle-rod 50, this can avoid blocking of the pushing axle-rod 50 during changing the grinding member. And the chuck 60 is pushed by the pushing axle-rod 50 to render the guiding bevel surface 62 on the chuck 60 to move away from the truncated conical inner surface 141 of the positioning sleeve 14, so that the chuck 60 can be loosened to allow changing of the grinding member.

On the contrary, after changing the grinding member, the rotating sleeve 30 is rotated in the contrary direction to restore the pushing member 40 to its original position, at this time, the pushing axle-rod 50 is influenced by the elastic restoring function of the restoring element 16 of the positioning sleeve 14 to displace toward the pushing member 40, so that the guiding bevel surface 62 on the chuck 60 is tightly pressed against the truncated conical inner surface 141 of the positioning sleeve 14, thereby an effect of clamping tight the work piece to be ground can be obtained.

One thing worth mentioning, the pivotally-connecting element 32 extends through the position-limiting slot 11 of the first pipe 10 to pivotally connect the pushing member 40, thereby, displacements of the rotating sleeve 30 and the pushing member 40 are limited by the position-limiting slot 11 to make the two members run in a suitable district. And referring to FIGS. 4, 5 and 6 simultaneously, the first pipe 10 is formed thereon two positioning holes 12 which each has therein a position-limiting element 13, and the rotating sleeve 30 is formed therein the positioning groove 33 at a position in coincident with that of the position-limiting elements 13, and the elastic piece 15 is provided at a position in opposition to that of the position-limiting elements 13 in the first pipe 10, by limitation of the elastic piece 15 and the positioning groove 33, when the rotating sleeve 30 is rotated to its proper position, the position-limiting elements 13 will get an effect of positioning and will create a sound meaning positioning to mention a user to rotate the rotating sleeve 30 to its proper position in order to avoid exerting of an overly large force to damage the rotating sleeve 30.

Moreover, the second pipe 20 is fixed therein with the driving element 21 which is connected with the electric power-line 22 through a connecting device 23, thereby when the driving element 21 is damage by unappropriate using, the driving element 21 can be conveniently changed directly through the connecting device 23. And by the fact that the restoring element 16 is fixed in the positioning sleeve 14 to abut against the pushing axle-rod 50, thereby, the entire hand tool can have its contour more reduced to lower the cost of production.

The names of the members are only for illustrating a preferred embodiment of the present invention, and not for giving any limitation to the scope of the present invention. It will be apparent to those skilled in this art that various equivalent modifications or changes made without departing from the spirit of this invention shall fall within the scope of the appended claims to be protected.

What is claimed is:

1. An improved structure of hand tool comprising a first pipe, a second pipe, a rotating sleeve, a pushing member, a pushing axle-rod and a chuck, wherein: said first pipe and said second pipe are connected and locked together integrally, said first pipe is provided thereon with a position-limiting sleeve having therein a restoring element and has on the external surface thereof two sliding bearings, said second pipe is provided therein with a driving element, said rotating sleeve is slipped over said first pipe, said pushing member is slipped over said pushing axle-rod and is provided in said first pipe, said pushing member is linked up with said rotating sleeve on one end thereof and is connected with said chuck on the other end thereof, an end of said pushing member connecting with said chuck is abutted against said restoring element, and said hand tool is formed; said structure is characterized in that:

said first pipe is provided thereon with said position-limiting slot, said rotating sleeve is pivotally connected with said pushing member through a pivotally-connecting element, said pivotally-connecting element extends through said position-limiting slot, said pushing axle-rod has a bearing slipping thereover to abut against said pushing member; and said first pipe is provided with two positioning holes which are provided therein each with a position-limiting element, said first pipe is provided therein at said position-limiting elements with an elastic piece and a positioning groove, said position-limiting elements displace in said positioning holes, thereby when in operation of said pushing axle-rod, said rotating sleeve and said pushing member are simultaneously rotated and moved respectively to push said pushing axle-rod, and thereby said chuck gets effects of loosening and clamping tight to attain an object of changing a grinding member during operation of said hand tool.

2. The improved structure of hand tool as claimed in claim 1, wherein said driving element is connected with an electric power-line through a connecting device.

3. The improved structure of hand tool as claimed in claim 1, wherein said restoring element is fixed in said positioning sleeve.

4. The improved structure of hand tool as claimed in claim 1, wherein said driving element is linked up with said pushing axle-rod through a driving rod and a notch.

5. The improved structure of hand tool as claimed in claim 1, wherein said pushing member is screw connected in said first pipe.

* * * * *